(12) United States Patent
Gonzales (10) Patent No.: US 8,782,905 B2
(45) Date of Patent: Jul. 22, 2014

(54) HAIR CLIPPER ATTACHMENT GUIDE

(76) Inventor: Anthony Thomas Gonzales, Cupertino, CA (US)

( * ) Notice: Subject to any disclaimer, the term of this patent is extended or adjusted under 35 U.S.C. 154(b) by 103 days.

(21) Appl. No.: 13/304,619

(22) Filed: Nov. 26, 2011

(65) Prior Publication Data

US 2012/0131801 A1      May 31, 2012

Related U.S. Application Data

(60) Provisional application No. 61/417,379, filed on Nov. 26, 2010.

(51) Int. Cl.
| | | |
|---|---|---|
| *B26B 19/02* | (2006.01) | |
| *B26B 13/00* | (2006.01) | |
| *B26B 19/04* | (2006.01) | |
| *B23D 29/02* | (2006.01) | |
| *B26B 13/24* | (2006.01) | |

(52) U.S. Cl.
CPC ........... B26B 19/04 (2013.01); *B23D 29/023* (2013.01); *B26B 13/24* (2013.01)
USPC ............................ 30/43.92; 30/233.5; 30/233

(58) Field of Classification Search
USPC .......... 30/233, 233.5, 198–202, 43.91, 43.92, 30/208–216
See application file for complete search history.

(56) References Cited

U.S. PATENT DOCUMENTS

| | | | | |
|---|---|---|---|---|
| 1,705,552 | A * | 3/1929 | Bauer | 30/202 |
| 2,590,684 | A * | 3/1952 | Clark | 30/202 |
| 2,703,450 | A * | 3/1955 | Larsen | 30/202 |
| 2,707,328 | A * | 5/1955 | Witthofft | 30/202 |
| 2,716,809 | A * | 9/1955 | Malone | 30/30 |
| 2,725,627 | A * | 12/1955 | Rekettye | 30/202 |
| 2,752,677 | A * | 7/1956 | James | 30/202 |
| 2,778,107 | A * | 1/1957 | Hazelquist | 30/201 |
| 2,896,323 | A * | 7/1959 | Guerra et al. | 30/201 |
| 2,911,715 | A * | 11/1959 | Seifert | 30/202 |
| 3,054,183 | A * | 9/1962 | Zucker | 30/202 |
| 3,055,376 | A * | 9/1962 | Walls | 132/213 |
| 3,060,574 | A * | 10/1962 | Thomas | 30/202 |
| 3,149,518 | A * | 9/1964 | Winestock | 83/176 |
| 3,302,286 | A * | 2/1967 | Zucker | 30/133 |
| 3,426,428 | A * | 2/1969 | Acciani | 30/202 |
| 6,243,955 | B1 * | 6/2001 | Forbers et al. | 30/233.5 |
| 7,140,115 | B2 * | 11/2006 | Greene | 30/526 |
| 2011/0107604 | A1 * | 5/2011 | Julemont | 30/201 |

* cited by examiner

*Primary Examiner* — Sean Michalski
*Assistant Examiner* — Jonathan G Riley
(74) *Attorney, Agent, or Firm* — Ilya Libenzon (57) ABSTRACT

A hair clipper attachment guide which attaches on hair clippers, particularly hair clipper blades, for the use of hair cutting guidance and assistance having a Base Plate with utilizes the functions of attached Wheels or Guidance Tracks to elevate as it travels across a scalp, resulting in various hair length cuts within its path.

4 Claims, 8 Drawing Sheets

HAIR CLIPPER ATTACHMENT GUIDE

CROSS-REFERENCES TO RELATED APPLICATIONS

This application claims the benefit of my provisional patent application Ser. No. 61/417,379, filed on Nov. 26, 2010 by the present inventor.

FIELD OF INVENTION

The present invention pertains to hair clipper guidance, providing assistance and guidance to the length of hair being cut.

BACKGROUND

Prior Art

The following is a tabulation of some prior art that presently appears relevant:

| U.S. Patents | | |
|---|---|---|
| Pat. No. | Issue Date | Patentee |
| 1,582,342 | April 1926 | Moore |
| 2,013,229 | September 1935 | Andis |
| 2,265,880 | December 1941 | Wahl |
| 2,275,110 | March 1942 | Monti |
| 2,716,809 | September 1955 | Malone |
| 2,809,425 | October 1957 | Tettis |
| 3,589,007 | June 1971 | Walton |
| 3,812,389 | May 1974 | Bowerman |
| 4,557,050 | December 1985 | Haraguchi et al. |
| 4,776,095 | October 1988 | Tsujimoto et al. |
| 4,825,546 | May 1989 | Araki et al. |
| 5,054,199 | October 1991 | Ogawa et al. |
| 5,084,974 | February 1992 | Sukow et al. |
| 5,092,048 | March 1992 | Sukow et al. |
| 5,325,589 | July 1994 | Kubo |
| 6,243,955 | July 2001 | Forbers & Forbers |

U.S. Pat. No. 6,243,955, this invention describes a disc that is rotated, which activates a sliding function of hair clipper blades, where hair gets fed into and cut. Hair clipper blades have 1 leading side that contains multiple comb-like blades. Each individual comb blade comes to a point, having less thickness as they do at their base. This invention is extremely restricted. Its function is simply sliding the hair clipper blades back and forth upon each other. Its function to cut various hair lengths is restricted to the thickness length of the hair clipper blades, which in most cases, is within a few millimeters. The function of this invention alternates the various cutting lengths only be motioning the said comb blades from its shortest thickness to its longest thickness. The hair clipper blades are never actually elevated.

U.S. Pat. No. 2,716,809 issued on Sep. 6, 1955, to Carl F. Malone describes a manually operated hair cutter having a blade assembly mounted on an oscillatory comb member. The blade assembly is urged forward by moving the hair cutter on a pair of sponge rubber treaded wheels to cut hair progressively shorter as the hair cutter travels over the hair. The hair cutter is distinguishable for the opposite effect of cutting hair shorter as the device is urged forward on the hair, a manual cutter with only one cutting effect, and the reliance on a pair of wheels to activate the cutter.

U.S. Pat. No. 2,275,110 issued on Mar. 3, 1942, to Philip Monti describes an attachment to a manually operated hair clipper to obtain a frictionless surface of the clipper for contact with the skin during the cutting operation. The frictionless surface is provided by a series of rollers arranged in parallel relationship to one another and transversely across the cutter head. The roller attachment is distinguishable for lacking the mechanical ability to enable a change in the cutting height.

U.S. Pat. No. 5,092,048 issued on Mar. 3, 1992, to Daniel L. Sukow et al. describes a spring-biased cutting head assembly for electric hair trimmers which can be releasable and operable mounted on hair trimmers having differently configured support tongues with or without ribs on a lower surface. The cutting head assembly is distinguishable for its adaptation only to different trimmers and is not concerned with fading during hair cutting.

U.S. Pat. No. 2,013,229 issued on Sep. 3, 1935, to Mathew Andis describes a power driven hair clipper with an actuator for the movable blade supported by a set of crossed flat springs which permit a swinging movement and the actuator provided with an armature in the magnetic field. The hair clipper is distinguishable for not having a mechanical cutting height adjustment.

U.S. Pat. No. 3,589,007 issued on Jun. 29, 1971, to William M. Walton describes an electric hair clipper operating on a rechargeable battery. The hair clipper is distinguishable for lacking a mechanical cutting height adjustment.

U.S. Pat. No. 3,812,389 issued on May 21, 1974, to Leonard E. Bowerman describes an electric hair clipper with an improved blade driving means comprising a vibratory motor with an armature that is pivotally supported by an upright bearing. The clipper is distinguishable for not having a mechanical cutting height adjustment.

BRIEF DESCRIPTION OF DRAWINGS

The components in the figures are not necessarily to scale, emphasis instead being placed upon illustrating the principles of the present invention. In the figures, like reference numerals designate corresponding parts throughout the different views.

In the drawings, closely related figures have the same number but different alphabetic suffixes.

FIG. 1A—A perspective, exploded view of an alternate embodiment. In this particular drawing, there are 4 Wheels (10), 2 on each side of the Base Plate (16), a Stabilizer Bar (14) for each pair of Wheels (10) on each side of the said embodiment, an Axel (6) per Wheel and an Axel Cap (12), per Axel (6), per Wheel (10).

FIG. 1B—A perspective view of FIG. 1A but is not in an exploded style. The Wheels (10) are at a position where the Hair Clippers (30) would be cutting at its minimum length if said embodiment was attached to Hair Clippers (30) and in use.

FIG. 1C—A perspective view of FIG. 1A but is not in an exploded style. The Wheels are at a position where the Hair Clippers (30) would be cutting at its maximum length if said embodiment was attached to Hair Clippers (30) and in use.

FIG. 2B—A perspective view of FIG. 2A fully assembled. The Wheels are at a position where the Hair Clippers (30)

would be cutting at its minimum length if said embodiment was attached to Hair Clippers (30) and in use.

FIG. 2C—A perspective view of FIG. 2A fully assembled. The Wheels are at a position where the Hair Clippers (30) would be cutting at its maximum length if said embodiment was attached to Hair Clippers (30) and in use.

FIG. 5B—A perspective view of FIG. 5A assembled.

FIG. 5C—A perspective view of guidance tracks corresponding to the embodiment depicted in 5A.

FIG. 6B—A perspective view of FIG. 3 attached on to a hair clipper.

| DRAWING - REFERENCE NUMBERS | | | |
|---|---|---|---|
| 2 | Comb Panels | 4 | Top of Comb Panels |
| 6 | Axel(s) | 8 | Axel Hole(s) |
| 10 | Wheel(s) | 12 | AxelCap(s) |
| 14 | Stabilizer Bar | 16 | Base Plate |
| 18 | Back Clip | 20 | Bottom of Base Plate |
| 22 | Bottom of Comb Panels | 24 | Slider Boot Control Arm |
| 26 | Slider Boot | 28 | Hair Clipper Blades(s) |
| 30 | Hair Clippers | 32 | Axel Slot |

| DRAWING - REFERENCE NUMBERS | | | |
|---|---|---|---|
| 34 | Gear/Axel Slot Housing | 36 | Wheel with Gear/Axel |
| 38 | Guidance Tracks | 40 | Receptor Gear [in Housing] |

DETAILED DESCRIPTION

The preferred embodiment of the present invention comprises of the following components, but is not limited to the following components; the Base Plate (16), Comb Panels (2), Axel(s) (6), Back Clip (18), Wheels (10), and Stabilizing Bars or a Slider Boot Control Arm (24) and a Slider Boot (26). The said embodiment attaches on Hair Clippers (30). Its physical size is approximately, but is not limited to, 4 inches in length, 3 inches in width and 2 inches in height.

The Base Plate is enabled with stationed Axels (6) on each side. The location of the stationed Axels (6) may vary. Each Wheel (10) is typically the same size of its symmetrical Wheel (10), located on the opposite side of the Base Plate (16). The typical shapes of the Wheels (10) are circular, but are not limited to that shapes. There are 4 Wheels (10), but is not limited to 4 Wheels (10), attached to the sides of the Base Plate (16) via the Axles (6). Most ordinary wheels we see today on cars, trucks and bikes have the axels inserted or mounted in the exact center of the wheel, enabling the Wheels (10) to rotate in a perfect balance, having all parameter points of the wheel at the same distance from the axel point/mount at any given rotation location. The Wheels (10) on the said embodiment have Axels (6) that are not mounted as so. Mounting the Axels (6) at an offset location, rather than the center of the Wheels (10) gives the said embodiment its primary feature. The Axels (6) that are inserted into the Wheels (10) are positioned near an edge of the Wheels (10). This way, as the Wheels (10) turn, the Base Plate (16) that the Axel (6) is attached to raises and/or lowers as the Wheels (10) turn.

The Comb Panels (2) start in the front of the Base Plate (16) and end at about the middle of the Base Plate (16). The number of Comb Panels (2) may vary, determined by the designer. Each Comb Panel start at a sharp point in the front of the Base Plate (16), extending towards the back of the Base Plate (16), progressively heightening, giving them a triangle shape if viewed from the side. The length of the Comb Panels (2) may vary widely, determined by the designer. The Comb Panels (2) are used to comb through hair right before the hair reaches the blades that cut the hair.

The Base of the Base Plate (16) is typically in a solid square or rectangle shape, but is not limited to those shapes. The size of the Base is approximately 1.5 inches in width, 2 inches in length and 0.25 inches in height, but is not limited to these dimensions.

The Back Clip (18) can be in virtually any shape. Its width may be a fraction of the width of the Base or it can extend along the whole back bottom of the Base. It typically protrudes out and down from the back bottom of the Base. Its main purpose is to snap on and hold the entire Base Plate (16) component on to the Hair Clippers (30). The various shapes and designs of the Back Clip (18) are typically dependent on the specified Hair Clippers (30) and designer, as different Hair Clippers (30) from different manufacturers have different ways of attaching their accessories on the Hair Clipper Blades (28).

The Stabilizing Bars (14) connects 2 Wheels (10), the pair of Wheels (10) that are on the same side of the Base Plate (16).

They are essentially a thin bar of any solid material; each end of the Stabilizing Bars (14) is penetrated into each of the two Wheels (10) (connecting to each Wheel (10)). The Stabilizing Bars are used to not allow each Wheel (10) to come in contact with one another and to assure that each Wheel (10) is rotating at the same speed.

Alternate Embodiments

Figure 8:
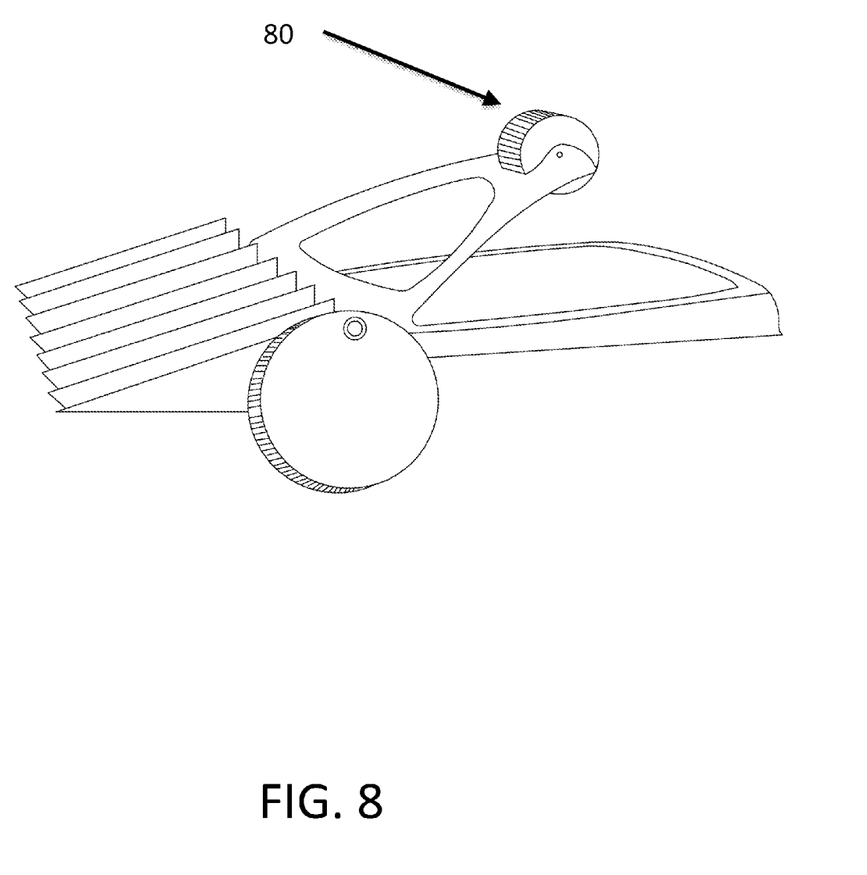
FIG. 8—A perspective view of an embodiment of the hair clipper attachment guide having a wheel 80 on a slider boot control arm.

"The said embodiment may have different designs and configurations to it. One of the designs may be, a design having only three Wheels (10). 2 Wheels (10) symmetrically attached to the top of the front right and left Comb Panels (2) and 1 Wheel (FIG. 8, 80) or 1 Slider Boot (26) with a Slider Boot Control Arm (24) that is positioned above the back middle of the back of the Comb Panels (2). The Slider Boot Control Arm (24) is used to position and stabilize the Wheel (80) or Slider Boot (26) that is attached to the back tip of it. In this design, the Stabilizing Bars may or may not be needed. (See FIG. 2A-2D & FIG. 3A-3C). Depending on the design, a Slider Boot Control Arm (24) may not be desired. Depending on the Design both of the Slider Boot Control Arm (24) and an attached Wheel(s) (80) and/or Slider Boot (26) may not be desired."

Another alternation may be having the Wheels (10) implement a curved Axel Slot (32) that the Axels (6) are inserted into. This curved slot allows the Axel (6) that is mounted within it to move/slide within the Axel Slot (32), having the Axel (6) stationed on the Base Plate (16) or on the Comb Panels (2). The Axel Slot (32) is strategically curved because the curves' attributes would dictate the length the hair is cut at various points within the Axle Slot (32). For example, if a user desires a style haircut that starts and ends within a 2 inch length (the starting of the fading process, the shortest hair height to the starting of the end desired hair height) to start out with a hair height of 1 mm and end at a hair height of a 3 mm, the Axel Slot (32) would have a starting point that is 1 mm distance from the point of contact that the Wheel (10) has with the scalp. After the Wheel (10) has traveled 2 inches across its diameter, the ending point on the Axel Slot (32) would be at a distance of 3 mm from the point of contact that the Wheel (10) has with the scalp. The Axel Slot (32) is curved in the same manner as the Wheels' (10) perimeter. Distance from the Comb Panels (2) become further from the contact points the Wheels (10) would have to the scalp as the Wheels (10) turn. (See FIG. 3A-FIG. 3C).

Another alternation may be having the Wheels (10) mounted with an Axel (6) and/or a full or partial Gear on it: the Wheel (10) with Gear/Axel (36) (See FIG. 4A-FIG. 4D & FIG. 5A-FIG. 5D). The Wheel (10) with Gear/Axel (36) would align up and insert into the Gear/Axel Slot Housing (34) unit. (See FIG. 4A-FIG. 4D & FIG. 5A-FIG. 5D).

The Wheel (10) with Gear/Axel (36) are assembled and positioned into the Axel Slot (32) and Receptor Gear (40) (Gear/Axel Slot Housing (34)) (See FIG. 4A-FIG. 4D & FIG. 5A-FIG. 5D). Align the Axel (6) that is on the Wheel with Gear/Axel (36) to the Axel Slot (32) that is on the Gear/Axel Slot Housing (34), simultaneously align the Gear that is on the Wheel with Gear/Axel (36) with the Receptor Gear (40) that is on the Gear/Axel Housing. Insert the Axel (6) and the Gear [on the Wheel (10)] into the corresponding Axel Slot (32) and Receptor Gear (40) in the Gear/Axel Housing (See FIG. 4A & FIG. 4B). As the Wheels (10) rotate, the Gear on Wheels (10) interacts with the Receptor Gear (40) that is mounted in/on the Gear/Axel Housing. When the Wheels (10) turn and all the said Gear components are motioning, the Axel (6) is free to slide/motion up and down the Axel Slot (32). The Gear/Axel Housing can be, but is not limited to being, attached to the outer left and right side of the Base Plate (16) or the outer left and right side of the Comb Panels (2); it can be attached at any level of angle, as to accommodate any specific Fad Style haircut. (See FIG. 4C and FIG. 5C). The Receptor Gear (40) and Axel Slot (32) may also be at an arched or straight angle (See FIG. 5A-FIG. 5D).

The Back Clip (18) is a component that assists in firmly latching hair clipper attachments onto Hair Clippers (30). The said component is not limited to being positioned in the back, as some hair clipper attachments may have or require the attachment latching component(s) to be positioned on the side of the attachment.

The said Wheel(s) (10) on all said embodiments may be partial Wheel(s) (10). Although there are full completed Wheel(s) (10) illustrated and described, the Wheel(s) (10) may not need to make complete rotations to achieve the fading hair cutting method. Thus, for manufacturing and conservation of materials, the Wheel(s) (10) may be partial, having an incomplete round shape perimeter.

Furthermore, any of the components may be arranged at any position and any location on any of the said embodiments and may also be in any configuration of any of the said components on any of the said embodiments, as to suit various styles of haircuts, manufacturing purposes and/or simply for design desires.

Furthermore, the HAIR CLIPPER ATTACHMENT GUIDE is not limited to the specified components and their corresponding designed illustrations. Designs of any and all of the said components are not limited to the illustrations on this patent application. Illustrations and corresponding specifications are for enlightenment of the utility of the HAIR CLIPPER ATTACHMENT GUIDE.

Another alternate embodiment of the present invention embodiment comprises of the following base components, but is not limited to the following components; the Base Plate (16) and Guidance Tracks (38). The Guidance Tracks (38) have a significant feature; the Axle Slot (32). The Axle Slots (32) are arced, being nearly parallel to one side's parameter of the Guidance Tracks (38). One end of the Axle Slot is positioned closer near the Guidance Tracks' parameter. The Axle Slot (32) is designed to become further away from the Guidance Tracks (38) parameter as it extends. This Axle Slot (32) design feature gives the said embodiment the primary feature it needs to progressively raise the Hair Clipper Blades (28) gradually as the said embodiment travels in any direction, gradually cutting the hair at a higher hair height as it travels. The Axels (6) stationed on the Base Plate (16) are inserted into the said Axel Slots that are within the Guidance Tracks (38). Thus, elevating the Base Plate (16) as the said embodiment travels. The general shape of the Guidance Tracks (38) is a triangle, but is not limited to that shape. Depending on design and/or alternate embodiments, there may be more or less number of Guidance Tracks (38).

Operation

Figures 1A, 1B:
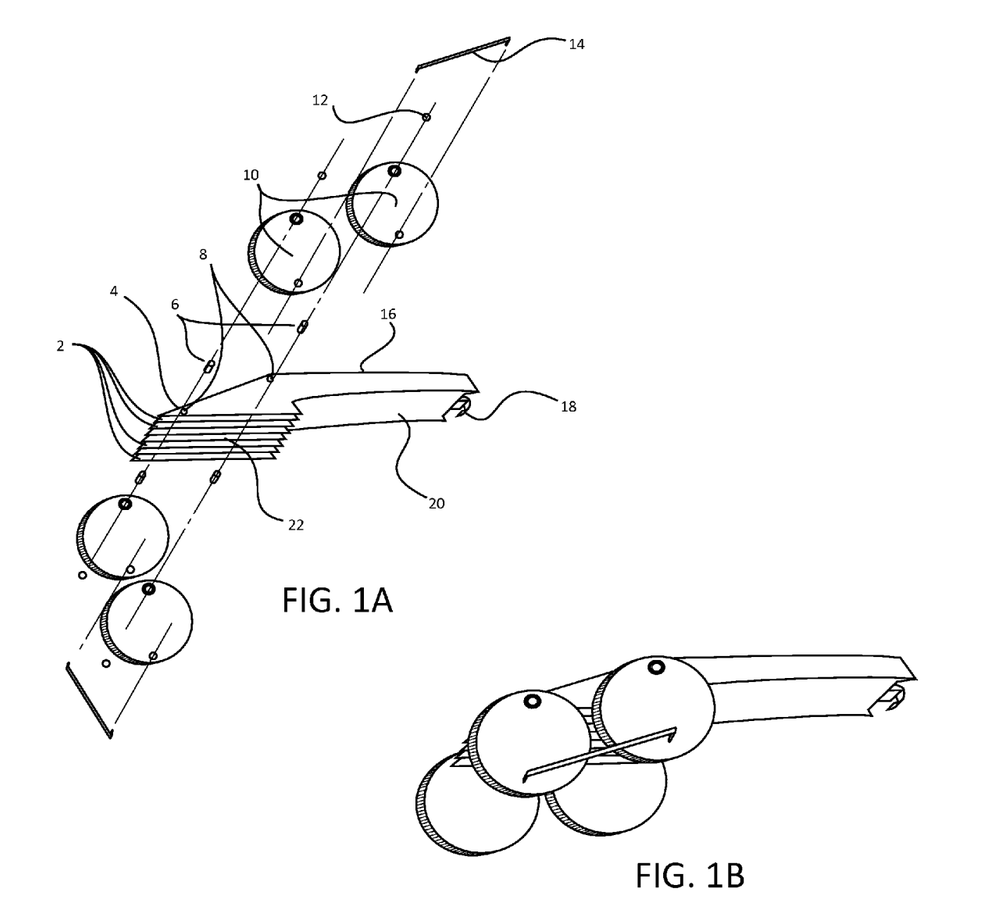
Figure 1C:
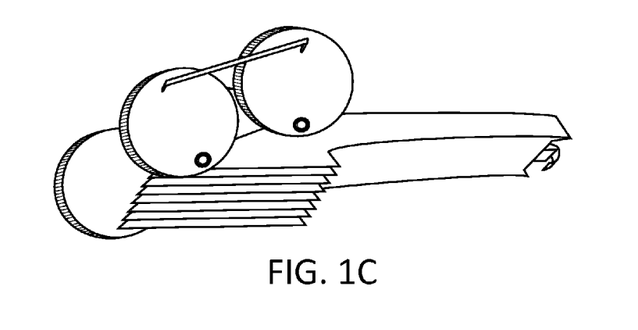
Figure 2A:
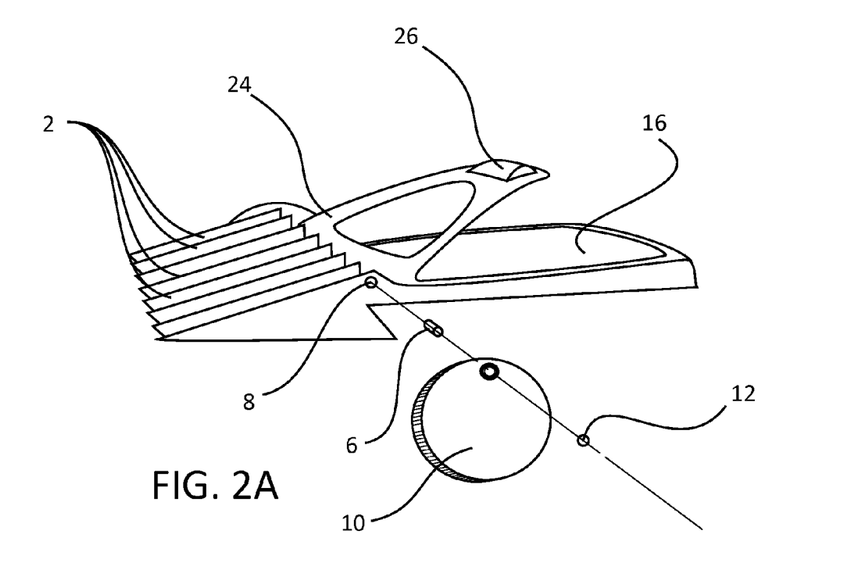
FIG. 2A—A perspective, exploded view of an alternate embodiment. In this particular embodiment, there are 2 Wheels (10), 1 on each side of the said embodiment, an Axel (6) and Axel Cap (12) per each Wheel (10) for assembling. There is a Slider Boot Control Arm (24) with a Slider Boot (26) attached at the endpoint of the Slider Boot Control Arm (24), stretching above and outwards towards the back of the Base Plate (16).
Figure 2B:
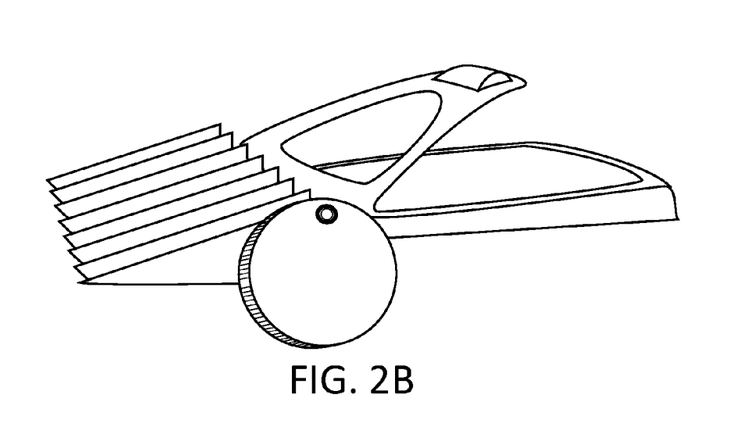
Figure 2C:
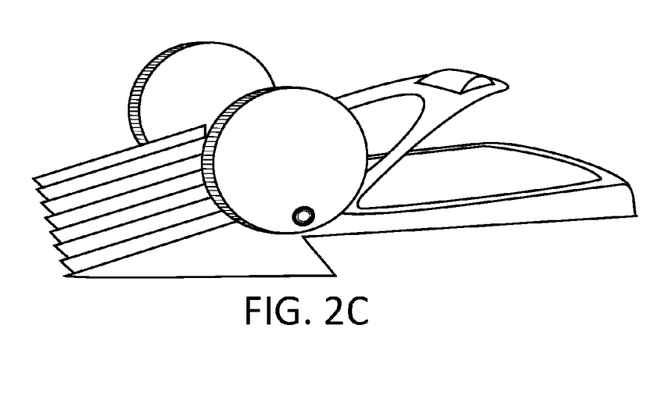
Figure 3A:
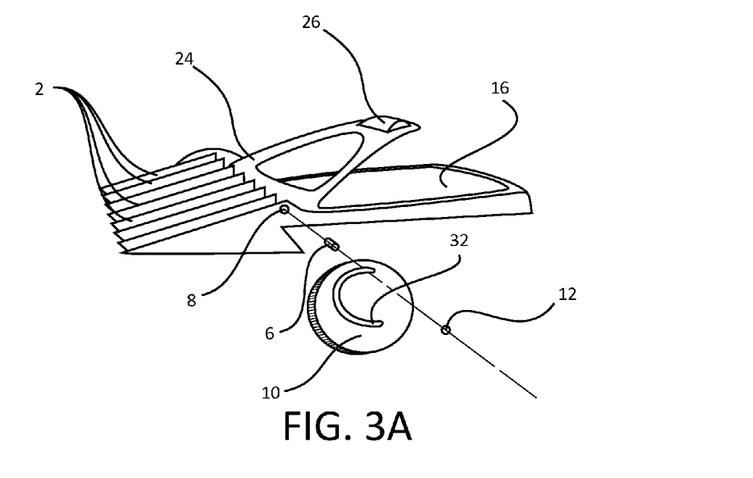
FIG. 3A—An alternate embodiment, perspective, exploded view of FIG. 2A with Wheels (10) that implement the Axel Slot (32) component, in which the Axel (6) is free to move to any position within the Axel Slot (32).
Figure 3B:
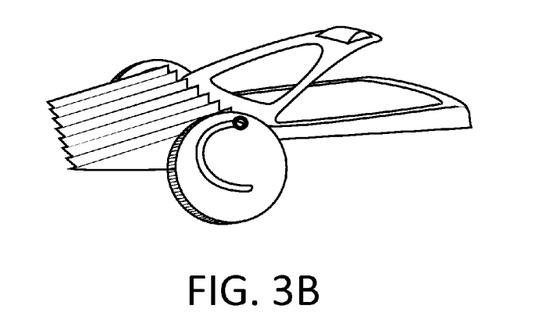
FIG. 3B—An assembled perspective view of FIG. 3A with the Axels (6) on the Wheels positioned at the point on the Axel Slots (32) that is closest to the rim/edges of the Wheels, when the Hair Clippers (30) would be cutting at its minimum length.
Figure 3C:
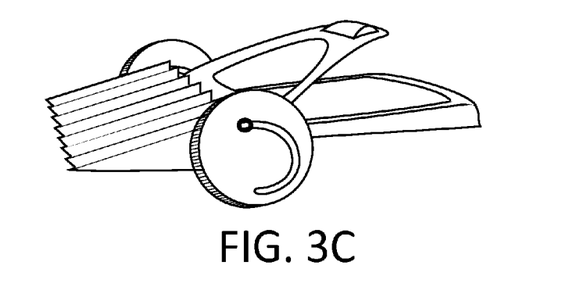
FIG. 3C—An assembled perspective view of FIG. 3A with the Axels (6) on the Wheels positioned at the point on the Axel Slots (32) that is furthest from the rim/edges of the Wheels, when the Hair Clippers (30) would be cutting at its maximum length.
Figure 4A:
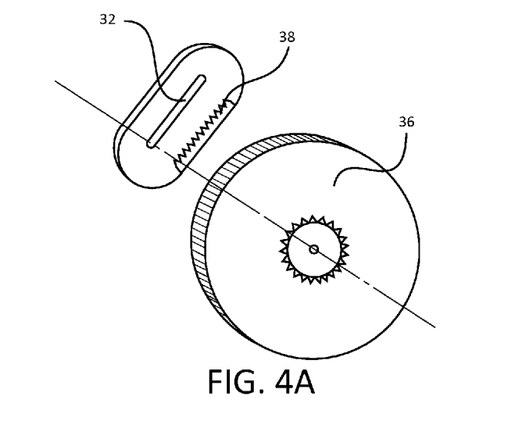
FIG. 4A—An exploded, alternate embodiment perspective view of a Gear/Axel Slot Housing (34) and a Wheel with Gear/Axel (36), Axel Slot (32) and Receptor Gear (40) is at a straight angle. The components within this FIG. are transparent for better illustration and understanding.
Figure 4B:
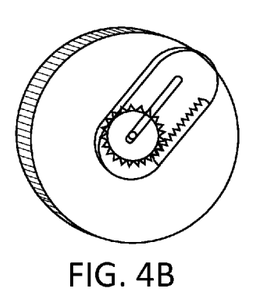
FIG. 4B—An assembled illustration of FIG. 4A. The components within this FIG. are transparent for better illustration and understanding.
Figure 4C:
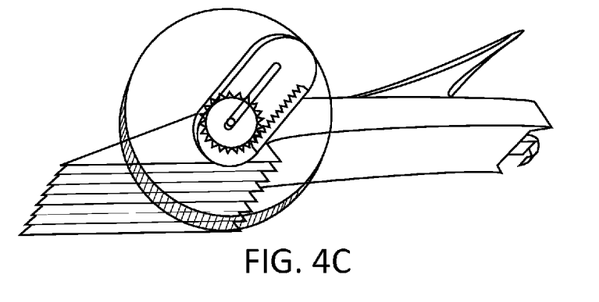
FIG. 4C—An assembled illustration of FIG. 4A, with illustration of Comb Panels (2), a Back Clip (18), Slider Boot (26) and Slider Boot Control Arm (24). The Wheel (10) is at its lowest level, when the Hair Clippers (30) would be cutting at its minimum length. Only 1 side of the assembled Gear/Axel Slot Housing (34) and a Wheel with Gear Axel is illustrated, there would be a symmetrical assembly on the opposite side of the Base Plate (16). All components except the Base Plate (16) are transparent for better illustration and understanding.
Figure 4D:
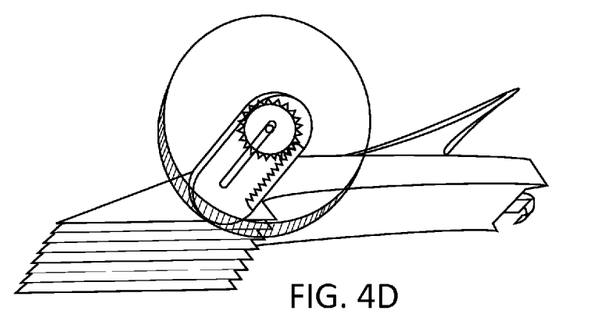
FIG. 4D—Is FIG. 4C with the Wheel a higher level, where the Hair Clippers (30) would be cutting at its maximum length. All components except the Base Plate (16) are transparent for better illustration and understanding.
Figure 5A:
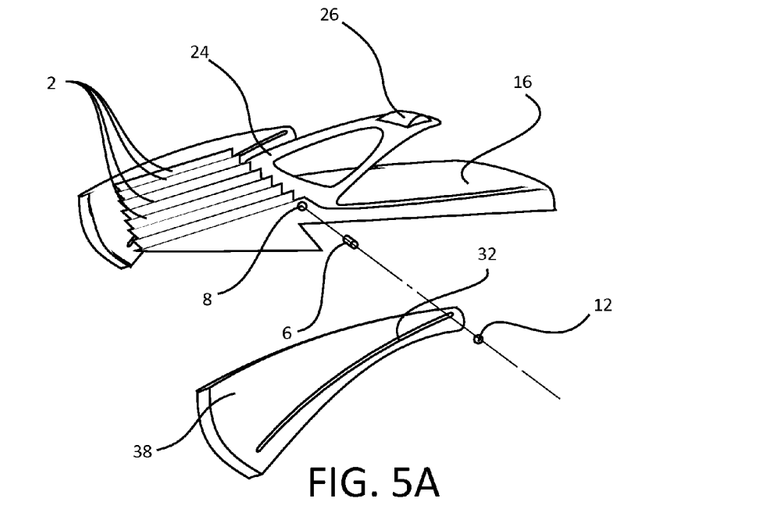
FIG. 5A—An exploded, perspective view of the present invention, having Guidance Tracks (38) located on each side of the Base Plate (16).
Figure 5B:
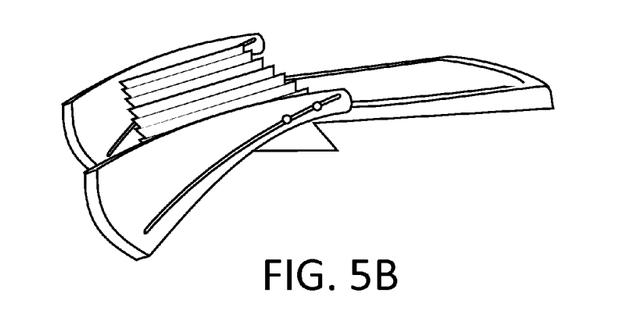
Figure 5C:
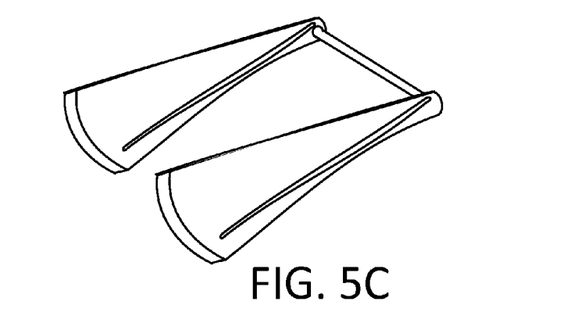
Figure 6A:
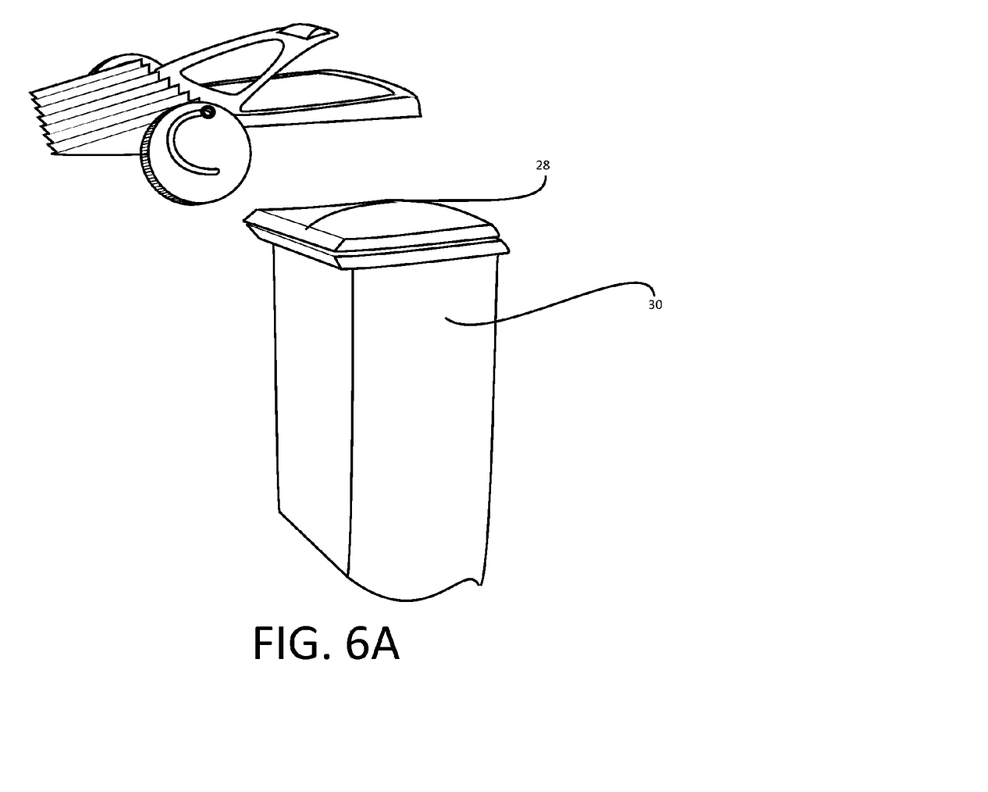
FIG. 6A—A perspective view of FIG. 3 located above a hair clipper.
Figure 6B:
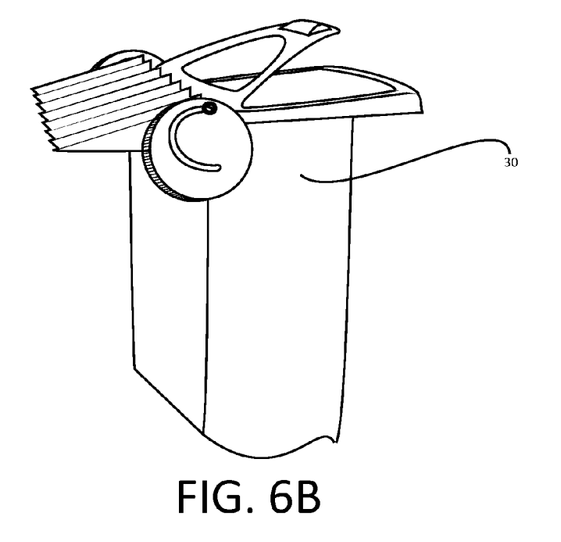
Figure 7:
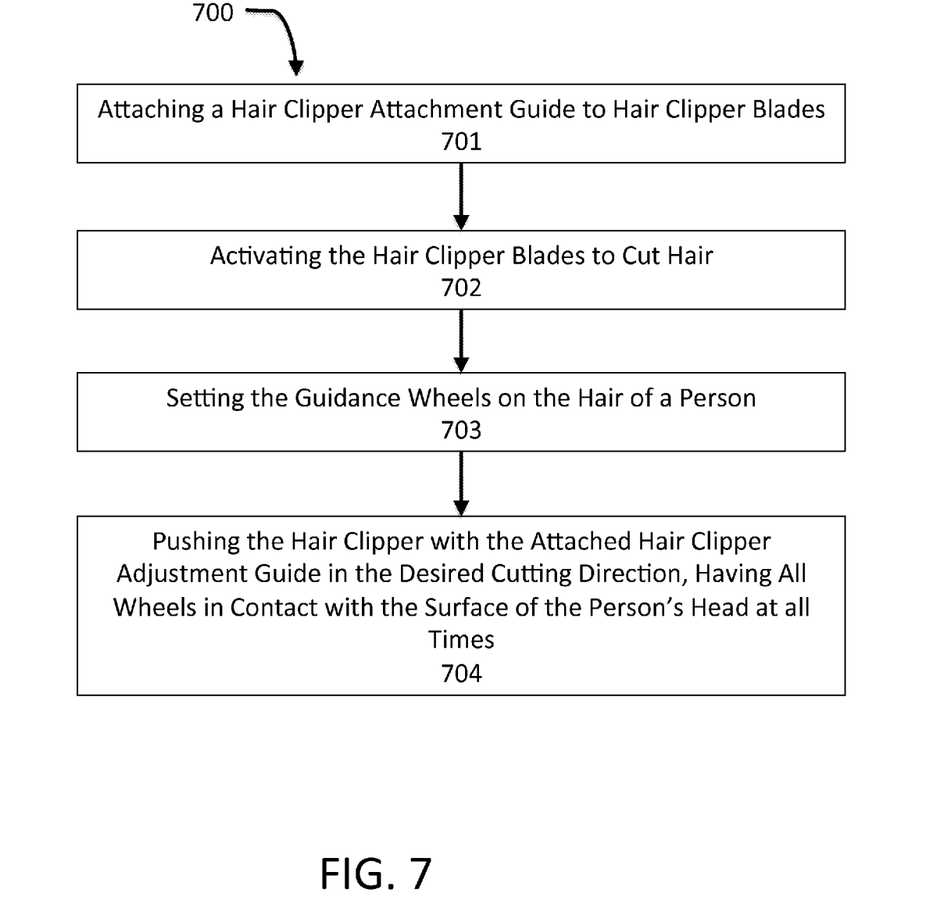
FIG. 7—A flow chart depicting an embodiment of the claimed method.

Due to different configurations of Hair Clippers (30), attaching the said embodiment is dependent on the different Hair Clippers (30) it is attaching to. Typically, as shown in FIG. 7, the user would affix the Hair Clipper Blades (28 of the clippers under the bottom Comb Panels (2), snapping the Back Clip (18) of the said embodiment on to the reciprocal (701), receiving attribute on the hair clipping blades or on another designated slot. Some Hair Clipper designs allow for Hair Clipper Attachments to attach or clip onto each side of the blade(s), alleviating the need for a Back Clip (18).

After the said embodiment is correctly attached on the Hair Clippers (30), the user turns on the Hair Clippers (30), activating the blades to cut hair 702. Place the hair clipping blades where the person would like to start the haircut, set all said Wheels (10) touching the area of the persons head 703. The user simply motions the Hair Clippers (30) in any desired direction, having all of the said Wheels (10) in contact with the persons head at all times 704. At the end of the cut, lift the Hair Clippers (30) up and start the same process over. The Wheels (10) are designed in conjunction with the strategically placed Axels (6), to gradually raise the cutting blades as the Hair Clippers (30) are motioned.

Conclusion, Ramification and Scope

The present invention is a hair clipper attachment device for assisting guidance for hair clippers, particularly the elevation of the hair clipper blades. The said invention is made up of, but is not limited to, 2 primary parts, these being; a Base Plate and Guidance Tracks. The Base Plate having a similar shape hair clipper blades, as it embraces the hair clipper blades. The said Base Plate has means of attaching itself to the said Guidance Tracks. An alternate embodiment of said Guidance Tracks are circular wheels having an off-center axle insertion location. Another alternate embodiment of said Guidance Tracks are circular wheels having an arced axle slot in which an axle, the said axle being stationed on said Base Plate, travels through the arced axle slot having various distances from the perimeter of the wheel. Which in turn, elevates the said Base Plate as the said axles travel through said arced axle slots.

I claim:

1. A hair clipper attachment guide, comprising: a base plate having a comb bearing end and a non-comb bearing end, the base plate having two sides located between the comb bearing end and the non-comb bearing end, the base plate including two axles, one axle protruding from one side of the base plate, and a second axle protruding from the other side of the base plate; a height adjustment component consisting of at least two guidance wheels on each of the two sides of the base plate, each of the guidance wheels including a curved axle slot, off-set from the center of the guidance wheel, and formed through each guidance wheel; wherein the first axle is located within the curved axle slot of one of the guidance wheels, and the second axle is located within the curved axle slot of the other guidance wheel; each wheel being attached to the base solely by the first or second axle, such that the guidance wheels move about each axle independent from one another.

2. The hair clipper attachment guide according to claim 1, further comprising a third wheel, mounted on a slider boot control arm attached to the base plate at a point on the non-comb-bearing end.

3. The hair clipper attachment guide according to claim 1, further comprising a slider boot, mounted on a slider boot control arm attached to the base plate at a point on the non-comb-bearing end.

4. The hair clipper attachment guide according to claim 1, further comprising a back clip located at the non-comb-bearing end of the base plate, and adapted to attach the hair clipper attachment guide to a hair clipper.

* * * * *